(No Model.)

A. W. LYDA.
BOLT.

No. 585,274. Patented June 29, 1897.

Witnesses
A. M. Poynton
H. F. Riley

Inventor
Arthur W. Lyda.
By his Attorneys,
C. A. Snow & Co.

THE NORRIS PETERS CO., PHOTO-LITHO., WASHINGTON, D. C.

United States Patent Office.

ARTHUR WARREN LYDA, OF JOHNSTOWN, PENNSYLVANIA.

BOLT.

SPECIFICATION forming part of Letters Patent No. 585,274, dated June 29, 1897.

Application filed August 19, 1896. Renewed May 28, 1897. Serial No. 638,642. (No model.)

*To all whom it may concern:*

Be it known that I, ARTHUR WARREN LYDA, a citizen of the United States, residing at Johnstown, in the county of Cambria and State of Pennsylvania, have invented a new and useful Bolt, of which the following is a specification.

The invention relates to improvements in bolts.

The object of the present invention is to improve the construction of bolts, to dispense with nuts, threads, and devices for preventing nuts from accidentally unscrewing, and to provide a simple, inexpensive, and efficient bolt possessing great strength and durability, adapted to be rapidly applied to rail-joints and other places where bolts are necessary, and capable of securely connecting and firmly clamping the parts together.

The invention consists in the construction and novel combination and arrangement of parts hereinafter fully described, illustrated in the accompanying drawings, and pointed out in the claims hereto appended.

Figure 1:
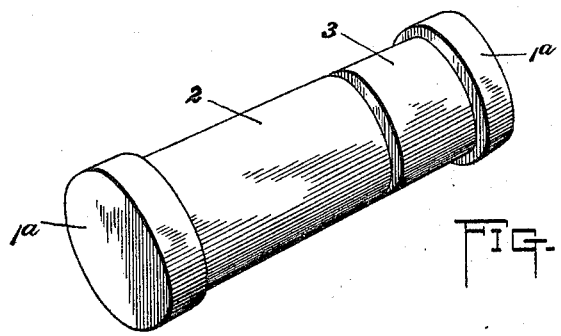
Figure 2:
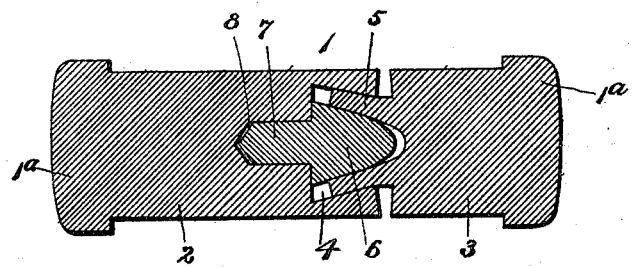
Figure 3:
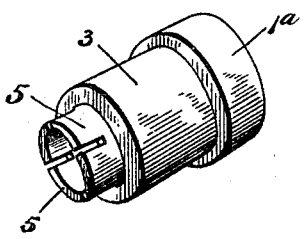
Figure 4:
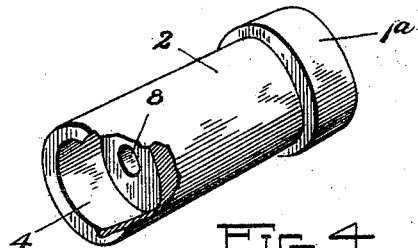
Figure 5:

In the drawings, Figure 1 is a perspective view of a bolt constructed in accordance with this invention, the sections being coupled. Fig. 2 is a longitudinal sectional view of the same. Figs. 3 and 4 are detail perspective views of the sections. Fig. 5 is a similar view of the conical wedge.

Like numerals of reference designate corresponding parts in all the figures of the drawings.

1 designates a bolt composed of sections 2 and 3, provided at their outer ends with heads 1ª, of any desired configuration, adapted to operate similar to the head of an ordinary bolt in engaging the parts to be connected or secured together.

The bolt has a substantially uniform diameter between its heads, and is adapted to be used similar to the ordinary bolt. The section 2 is provided with a smooth tapering socket 4, of truncated conical shape, having a reduced mouth and presenting beveled inner faces and gradually increasing in diameter to its inner end. The other section 3 is solid, and when coupled with the section 2 forms a continuation thereof, and it is provided at its inner end with a series of smooth arms 5, preferably arranged in annular form, and consisting of a longitudinally-slotted cylindrical extension of the section 3. The outer periphery of the arms 5 is of the same diameter as the reduced or constricted mouth of the tapering cavity or socket of the section 2 of the bolt, and the said arms when the sections of the bolt are forced together are spread by the cylindrical wedge 6, arranged within the socket or cavity of the section 2 of the bolt.

The conical wedge, which is smooth, has its beveled faces arranged parallel with the wall of the socket or cavity 4, and it is provided with an integral shank 7, fitting within a centrally-arranged perforation 8 of the section 2 of the bolt and holding the conical wedge firmly in position for spreading the arms of the section 3. As the parts or sections of the bolt come together the arms 5 are gradually spread and are arranged within the annular space between the conical wedge and the wall of the socket, making the bolt absolutely solid at the point of connection of the sections and securely locking the parts together. The conical wedge and the arms fit snugly within the socket and substantially fill the same.

It will be seen that the bolt is exceedingly simple and inexpensive in construction, that it is strong and durable, and that it dispenses with nuts and threads and devices for locking nuts against accidental unscrewing. It will also be apparent that the bolt is applicable to rail-joints and all other places where bolts are usually employed and that the sections may be rapidly connected and quickly applied in position.

Changes in the form, proportion, and minor details of construction may be resorted to without departing from the spirit or sacrificing any of the advantages of this invention.

What I claim is—

1. A bolt provided with a head at each end and having a substantially uniform diameter between the heads and comprising two sections, one of the sections having a smooth socket provided with a reduced or constricted mouth or entrance, arms mounted on the other section and arranged to be inserted in the socket, and having smooth inner and outer faces, and a smooth wedge located within the socket and arranged to spread the said arms, whereby the two sections of the bolt are coupled, substantially as described.

2. A bolt provided at its ends with heads, having a substantially uniform diameter between the heads and comprising two sections, one of the sections being provided with a smooth tapering socket having a reduced mouth or entrance and gradually increasing in diameter toward its inner end, an annular series of arms having smooth inner and outer faces mounted on the other section and arranged to enter the mouth of the socket, and a smooth conical wedge located within the socket and adapted to spread the arms, substantially as described.

3. A bolt provided at its ends with heads and having a substantially uniform diameter between the same and comprising two sections, one of the sections having a smooth tapering socket and provided with a centrally-arranged perforation at the inner enlarged end of the socket, a smooth conical wedge arranged within the socket and provided with a centrally-arranged shank fitting in a perforation of the section, and a smooth slotted cylindrical extension mounted on the other section of the bolt, having its exterior periphery of the same diameter as the mouth of the socket and forming a series of arms adapted to be spread within the socket by the conical wedge, whereby the two sections of the bolt are coupled, substantially as and for the purpose described.

In testimony that I claim the foregoing as my own I have hereto affixed my signature in the presence of two witnesses.

ARTHUR WARREN LYDA.

Witnesses:
J. WALLACE PAUL,
S. G. FETTERMAN.